United States Patent
Spangler et al.

(10) Patent No.: US 6,745,298 B2
(45) Date of Patent: Jun. 1, 2004

(54) INTERNAL PROCESSOR BUFFERING FOR IMPLICIT WRITEBACKS

(75) Inventors: Steven J. Spangler, El Dorado Hills, CA (US); Varghese George, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/334,060

(22) Filed: Jun. 16, 1999

(65) Prior Publication Data

US 2003/0070048 A1 Apr. 10, 2003

(51) Int. Cl.[7] .............................................. G06F 12/00
(52) U.S. Cl. ...................... 711/146; 711/100; 711/118; 711/143; 711/146; 711/154
(58) Field of Search ................................. 711/100, 118, 711/122, 130, 141, 146, 154, 140

(56) References Cited

U.S. PATENT DOCUMENTS

| | | | |
|---|---|---|---|
| 5,197,144 A | * 3/1993 | Edenfield et al. | 711/143 |
| 5,355,467 A | * 10/1994 | MacWilliams et al. | 711/146 |
| 5,710,906 A | * 1/1998 | Ghosh et al. | 711/146 |
| 5,745,732 A | * 4/1998 | Cherukuri et al. | 711/168 |
| 5,813,036 A | * 9/1998 | Ghosh et al. | 711/146 |
| 5,881,256 A | * 3/1999 | Lee | 710/129 |
| 6,148,416 A | * 11/2000 | Masubuchi | 714/15 |
| 6,151,641 A | * 11/2000 | Herbert | 710/22 |
| 6,209,068 B1 | * 3/2001 | Hill et al. | 711/159 |

* cited by examiner

Primary Examiner—Tuan V. Thai
(74) Attorney, Agent, or Firm—Kenyon & Kenyon

(57) ABSTRACT

A method and apparatus for processing data is described. A request such as a multiprocessor snoop request for data is received from a bus. A determination is made as to whether a cache contains the data. The data is placed in a buffer. A determination is made as to whether the bus can receive the data. The data is sent to the bus.

21 Claims, 3 Drawing Sheets

INTERNAL PROCESSOR BUFFERING FOR IMPLICIT WRITEBACKS

FIELD OF THE INVENTION

The invention relates to computers in general. In particular, the invention relates to a method and apparatus for performing implicit writebacks in a computer system.

BACKGROUND OF THE INVENTION

In a shared memory multiprocessor system, data necessary for one processor is often present in a cache of another processor. It is more efficient to retrieve such data from the cache rather than memory. Furthermore, the system must ensure that a request for data (e.g., by a processor or input/output device) is answered with the most current version of the data available. Therefore, the system processes a request for data by first attempting to retrieve the requested data from a processor's internal cache before going to main memory.

In conventional multiprocessor systems, a request for data is originated by a first processor. The other processors detect the data request and ascertain whether they have the requested data in one of their internal caches ("snoop phase"). If the requested data is present, the processor must provide the requested data on a bus for transport to the first processor ("data phase"). This entire process is typically governed by a particular bus protocol for the system, and is generally referred to as an "implicit writeback" scheme.

Conventional implicit writeback schemes, however, may be less than satisfactory for a number of reasons. For example, if the requested data for a data request from a first processor is found within a second processor's internal cache, the cache system for the second processor must determine whether the data request is at the top of a request queue before it can start reading out the data from the cache. The request queue maintains a record of the transactions occurring on the bus, and determines the order in which a particular transaction (e.g., data request) can be performed. If the data request is not at the top of the request queue, retrieval of the requested data from the cache must wait until the data request reaches the top of the request queue. This introduces unnecessary delay into the data phase, especially given the number of processing cycles it can take to actually retrieve the requested data from the second processor's internal cache (e.g., an L2 cache). Retrieval of data from the second processor's internal cache can be time consuming for a number of reasons, such as competing demands for data within the internal cache from the second processor itself. Moreover, if another data request comes in behind the waiting data request, the implicit writeback process for the other data request cannot begin until the waiting data request is completed.

In view of the foregoing, it can be appreciated that a substantial need exists for a method and apparatus that solves the above-discussed problems.

SUMMARY OF THE INVENTION

One embodiment of the invention comprises a method and apparatus for processing data. A request for data is received from a bus. A determination is made as to whether a cache contains the data. The data is placed in a buffer. A determination is made as to whether the bus can receive the data. The data is sent to the bus.

DETAILED DESCRIPTION

The embodiments of the invention provide an improved implicit writeback scheme for use in multiprocessor system. The improved implicit writeback scheme retrieves data from a cache faster and more efficiently than conventional implicit writeback techniques. This may result in a faster, and more efficient, computer system.

More particularly, the embodiments of the invention begin the data retrieval process earlier than conventional implicit writeback techniques. If the cache system for a processor determines that it has the requested data for a particular data request in one of its internal caches, it immediately begins retrieving the requested data from the cache and stores the data in a buffer. This is in contrast to conventional systems, wherein the cache system waits for permission from the request queue to begin retrieving the requested data. The cache system then sends the data from the buffer to the requesting processor via a connecting bus once the data request reaches the top of the request queue. By reading out the requested data from the buffer rather than from the internal cache, the embodiments of the invention can minimize the delay associated with the retrieval of data from an internal cache (e.g., competing demands for data within the internal cache).

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
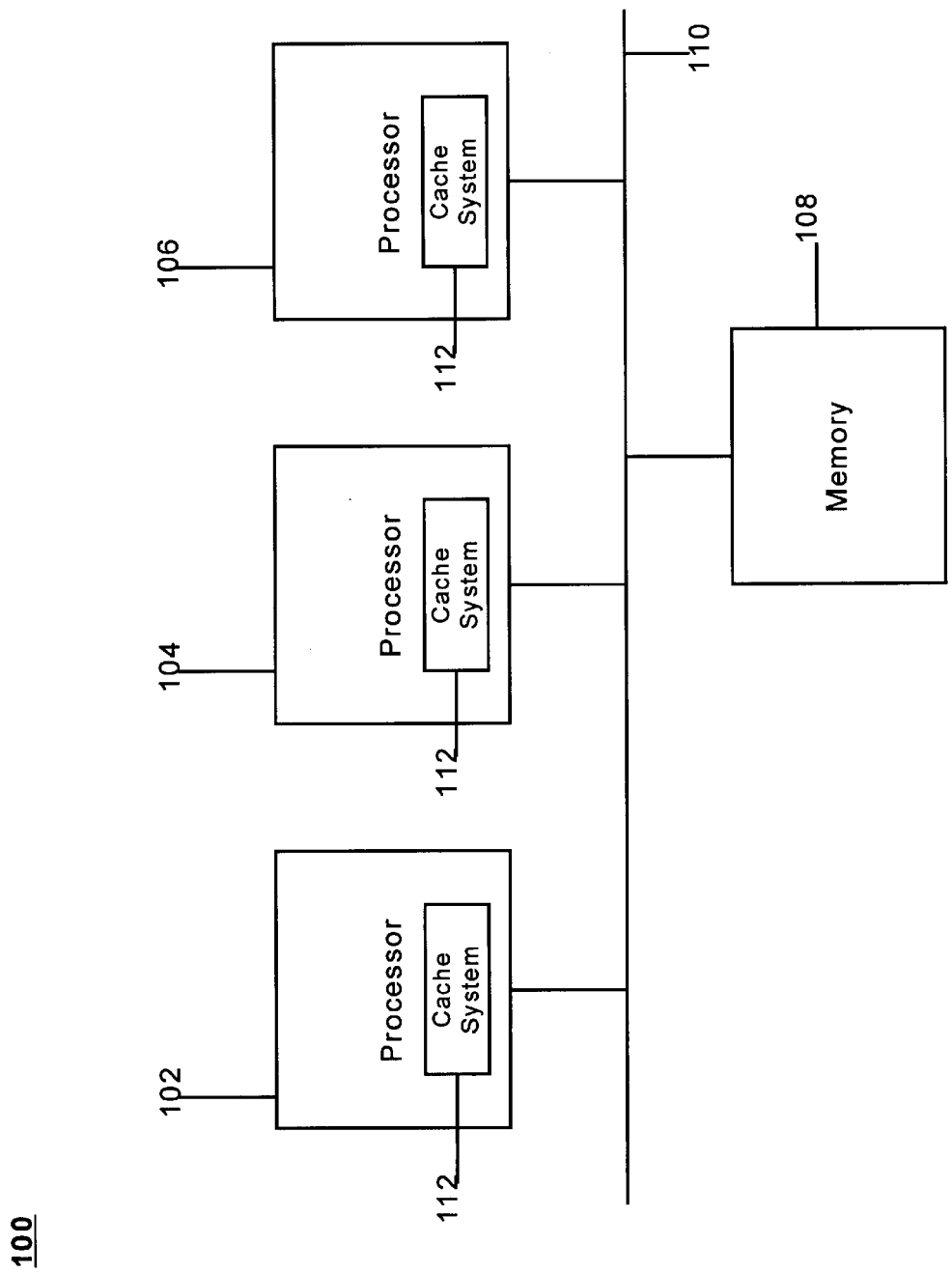
FIG. 1 is a block diagram of a multiprocessor system suitable for practicing one embodiment of the invention.

Referring now in detail to the drawings wherein like parts are designated by like reference numerals throughout, there is illustrated in FIG. 1 a multiprocessor system suitable for practicing one embodiment of the invention. As shown in FIG. 1, a multiprocessor system 100 comprises processors 102, 104 and 106. Each processor includes a cache system 112. System 100 also includes a memory 108, which is connected to processors 102, 104 and 106 via a bus 110.

It can be appreciated that the particular configuration shown herein is chosen as an example only and is not limitive of the type of computer system on which the present invention can work. The number of configurations that computer systems can take are virtually limitless and techniques for setting up these configurations are well known to those skilled in the art. The present invention can operate on any of these possible configurations.

Figure 2:
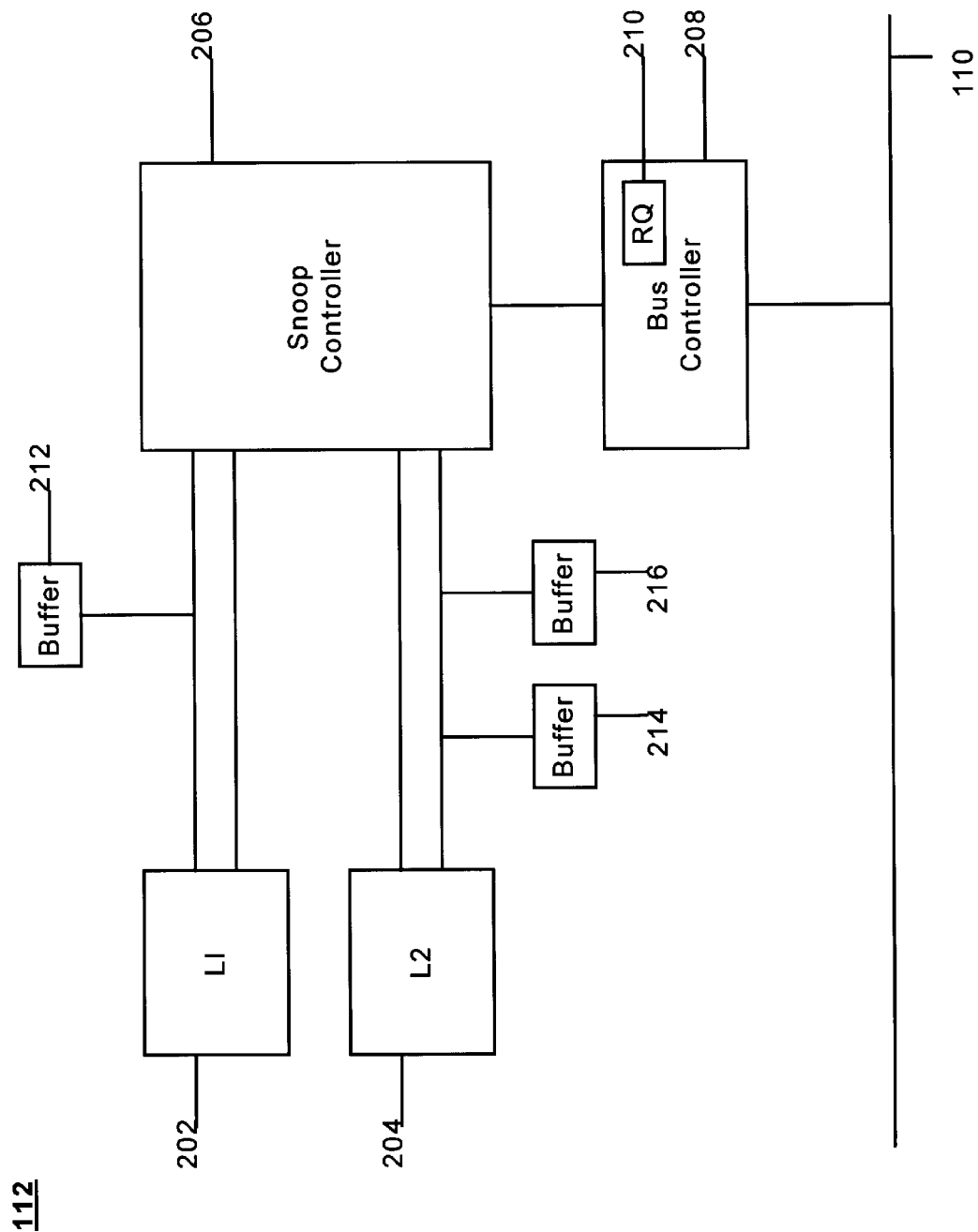
FIG. 2 is a block diagram of a cache system in accordance with one embodiment of the invention.

FIG. 2 is a block diagram of a cache system in accordance with one embodiment of the invention. FIG. 2 shows cache system 112 comprising a snoop controller 206 connected to bus 110 via a bus controller 208. Bus controller 208 includes a request queue 210. In this embodiment of the invention, the request queue is implemented as an in order queue (IOQ). Snoop controller 206 is also connected to an L1 cache 202, an L2 cache 204, and buffers 212, 214 and 216.

Cache system 112 performs implicit writebacks in accordance with a bus protocol. In this embodiment of the invention, cache system 112 performs implicit writebacks in accordance with the Intel® Pentium® Pro bus protocol.

Snoop controller 206 controls the overall operation for the implicit writeback scheme. In particular, snoop controller 206 implements in circuit form an implicit writeback algorithm discussed in detail with reference to FIG. 3. The operation of cache system 112 in general, and snoop controller 206 in particular, will be discussed with reference to FIG. 3.

Figure 3:
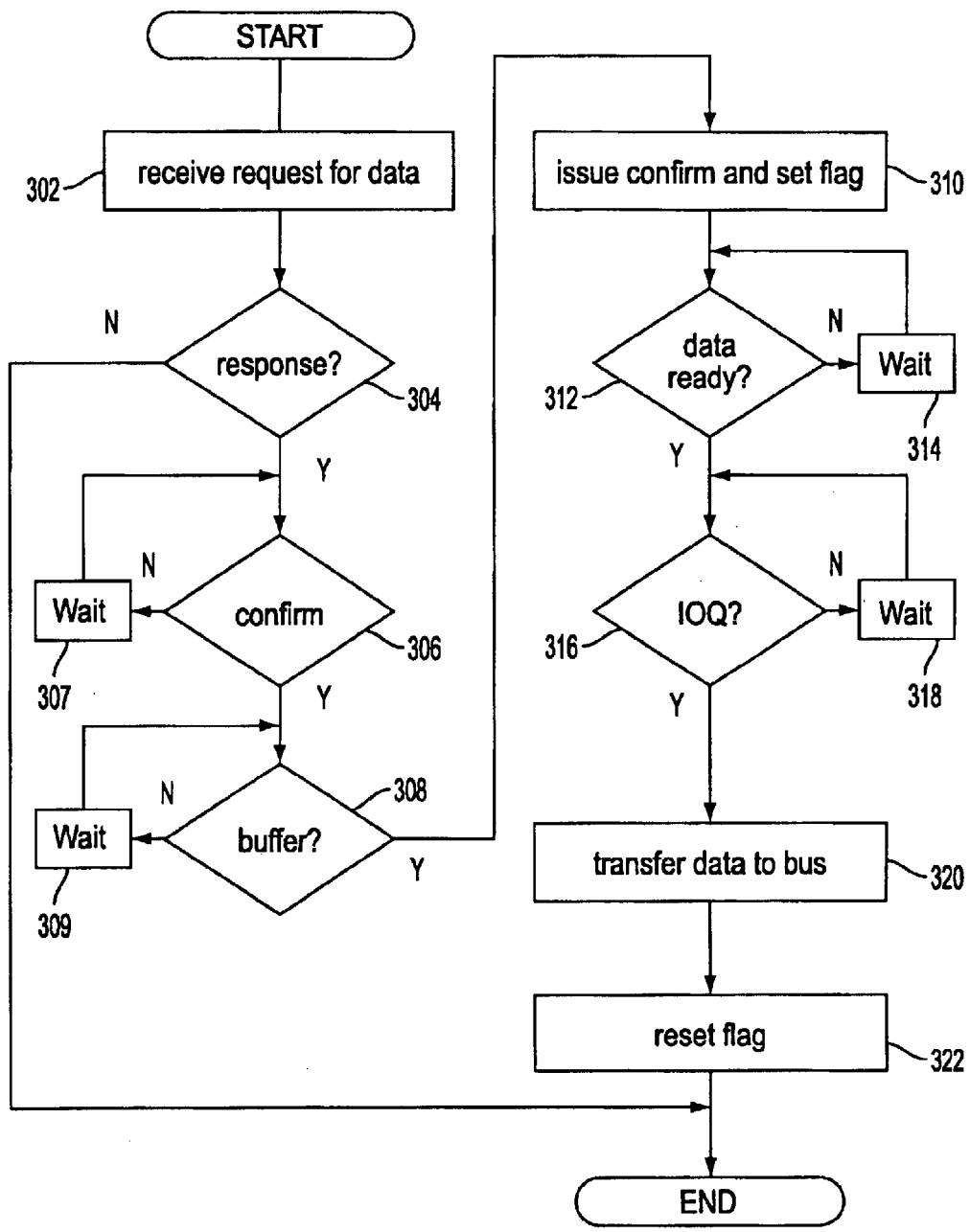
FIG. 3 is a block flow diagram of the operation of a snoop controller in accordance with one embodiment of the invention.

FIG. 3 is a block flow diagram of the operation of a snoop controller in accordance with one embodiment of the invention. As shown in FIG. 3, a data request is received by a processor over a bus at step 302. A determination is made as to whether the requested data is present in one of its internal caches of the processor at step 304. It is worthy to note that cache data can be in one of many states, depending on such factors as which processor "owns" the data and whether it has been modified. In this embodiment of the invention, information in a processor's data cache may be stored in one of four possible states: (1) modified state; (2) exclusive state; (3) shared state; and (4) invalid state (often referred to as the MESI cache protocol). Furthermore, for purposes of clarity, in this embodiment of the invention a processor is only required to provide requested data that is in a modified (M) state. The data, however, may be in a different state and/or may be described using a different protocol. Any one or more states indicating that data is present in the cache and can be provided to the bus by the processor may be detected in step 304.

If the requested data is not present at step 304, the process is completed. If the requested data is present at step 304, a determination is made as to whether the error phase has been passed and that the present data request is the oldest data request requiring service by the processor at step 306. The error phase relates to whether any errors were in the request itself as received from the bus. If the error phase has not passed or the present data request is not the oldest data request at step 306, the algorithm waits until both conditions are true at step 307. Once both conditions are true at step 307, a determination is made as to whether a buffer is available at step 308. This can be accomplished using a buffer flag or "buffer-in-use" signal. If the buffer is in use, the algorithm waits at step 309 until the buffer is available for use. Once the buffer is available, a confirmation is issued from the snoop controller to the cache to initiate retrieval of the requested data, and the buffer flag is set to indicate the buffer is in use at step 310.

Once the buffer is available for use, the data retrieval process is performed at step 312. The requested data is retrieved and stored in the buffer. If the requested data is not yet stored in the buffer at step 312, the algorithm waits at step 314 until the data is stored in the buffer. Once the data is ready in the buffer at step 312, a determination is made as to whether the data request is at the top of a request queue e.g., IOQ) at step 316. If the data request is not at the top of the request queue at step 316, the algorithm waits at step 318 until the data request actually reaches the top of the request queue. Once the data request reaches the top of the request queue at step 316, the requested data stored in the buffer is transferred to bus 110 at step 320. The buffer flag is then cleared at step 322, and the process for the data request is completed.

The implicit writeback scheme of FIG. 3 may be better understood using an example. For clarity, system 100 and cache system 112 will be used in the example. It can be appreciated, however, that the principles set forth herein could be used with any multiprocessor system or cache system and still fall within the scope of the invention.

In this example, processor 102 sends a data request over bus 110. Cache system 112 of processors 104 and 106 receive the data request and begin the snoop phase at step 302. Cache system 112 determines whether the requested data is present in one of its internal caches L1 202 or L2 204, and whether the requested data is in an M state, at step 304. If caches L1 202 or L2 204 do not have the requested data in an M state at step 304, then the process is completed. If either L1 202 or L2 204 does have the requested data in an M state at step 304, however, then snoop controller 112 determines whether the error phase has been completed by bus controller 208 and that the present data request is the oldest data request requiring servicing it has received at step 306. If the error phase has not passed or the present data request is not the oldest data request at step 306, snoop controller 206 waits until both conditions are true at step 307. Once both conditions are true at step 307, snoop controller 206 determines at step 308 whether buffer 212, 214 or 216 are in use, depending on whether the requested data is in L1 cache 202 or L2 cache 204, respectively. In this example, the requested data is stored in L2 cache 204. Thus, if both buffers 214 and 216 are in use, snoop controller 206 waits at step 309 until one of the two buffers becomes available for use. Once a buffer is available, for example buffer 216, snoop controller 206 issues a confirmation to the cache and sets the buffer flag to indicate buffer 216 is in use at step 310.

Once buffer 216 is available for use, snoop controller 206 performs the retrieval process to retrieve the requested data from L2 cache 204 at step 312. If the retrieval process for the requested data is not yet completed at step 312, snoop controller 206 waits at step 314 until the data has been stored in the buffer. Once the data is ready in the buffer at step 312, snoop controller 206 checks with bus controller 208 to determine whether the data request is at the top of request queue 210 at step 316. If the data request is not at the top of request queue 210 at step 316, snoop controller 206 waits at step 318 until the data request reaches the top of request queue 210. Once bus controller 208 indicates that the data request is at the top of request queue 210 at step 316, snoop controller 206 begins transferring the requested data stored in buffer 216 to bus 110 via bus controller 208 at step 320. Snoop controller 206 then clears the buffer-in-use flag for buffer 216 at step 322, and terminates the process for the data request.

Although various embodiments are specifically illustrated and described herein, it will be appreciated that modifications and variations of the present invention are covered by the above teachings and within the purview of the appended claims without departing from the spirit and intended scope of the invention. For example, although only two buffers (buffers 214 and 216) were used for L2 cache 204, it can be appreciated that any number of buffers could be used with cache system 112 and still fall within the scope of the invention.

What is claimed is:

1. A method comprising:

receiving a snoop request for data from a bus;

determining whether a cache of a cache system contains said data;

placing said data in a buffer if said cache contains said data;

determining whether said data in said buffer is available;

checking a request queue holding said request, said request queue having a top and a bottom;

determining whether said request is at said top of said request queue;

indicating said request is next for processing, if said request is at said top of said request queue;

indicating said bus can receive said data, if said data in said buffer is available and said request is next for processing; and sending said data to said bus.

2. The method of claim 1, wherein said determining whether said cache contains said data comprises:
determining whether said request is next for processing;
searching said cache for said data;
determining whether said data is in a modified state; and
indicating said modified data is in said cache.

3. The method of claim 1, wherein said placing comprises:
retrieving said data from said cache; and
storing said data in said buffer.

4. The method of claim 3, wherein said storing comprises:
determining whether said buffer is available;
indicating said buffer is in use if said buffer is available; and
waiting until said buffer is available if said buffer is unavailable.

5. The method of claim 1, wherein said request originated from a first processor, and wherein said receiving comprises:
receiving said request at a second processor;
determining whether said request has any error; and
indicating said request is without errors.

6. The method of claim 4, wherein said cache is within said second processor.

7. The method of claim 1, wherein said sending comprises:
transferring said data from said buffer to said bus; and
indicating said buffer is available once said data has been transferred.

8. The method of claim 1, wherein said cache is an L2 cache.

9. The method of claim 1, wherein said cache is an L1 cache.

10. A cache system, comprising:
a first controller;
a second controller operably coupled to said first controller;
a cache operably coupled to said first and second controller; and
a buffer operably coupled to said first controller, said second controller and said cache, the cache system to
receive a snoop request for data from a bus;
determine whether said cache contains said data;
place said data in said buffer if said cache contains said data;
determine whether said data in said buffer is available;
check a request queue holding said request, said request queue having a top and a bottom;
determine whether said request is at said top of said request queue;
indicate said request is next for processing, if said request is at said top of said request queue;
indicate said bus can receive said data, if said data in said buffer is available and said request is next for processing; and
send said data to said bus.

11. The apparatus of claim 10, wherein said first controller is a snoop controller.

12. The apparatus of claim 11, wherein said second controller is a bus controller.

13. The apparatus of claim 12, wherein said bus controller includes a request queue.

14. The apparatus of claim 13, wherein said bus controller determines whether a data request is next for processing using said request queue.

15. The apparatus of claim 14, wherein said snoop controller retrieves data from said cache prior to said determination.

16. The apparatus of claim 15, wherein said retrieved data is stored in said buffer.

17. An apparatus comprising:
a first controller to retrieve data;
a second controller operably coupled to said first controller, said second controller to determine whether data can be placed on a bus using a request queue;
a cache operably coupled to said first and second controller, said cache storing data requested by a processor; and
a buffer operably coupled to said first controller, said second controller and said cache, wherein said first controller retrieves said requested data from said cache and stores said requested data in said buffer prior to said determination the apparatus to
receive a snoop request for data from said bus;
determine whether said cache contains said data;
place said data in said buffer if said cache contains said data;
determine whether said data in said buffer is available;
check said request queue holding said request, said request queue having a top and a bottom;
determine whether said request is at said top of said request queue;
indicate said request is next for processing, if said request is at said top of said request queue;
indicate said bus can receive said data, if said data in said buffer is available and said request is next for processing; and
send said data to said bus.

18. A method, comprising:
storing a snoop request in a queue;
initiating a cache lookup transaction;
storing data returned in response to the cache lookup transaction in a buffer, wherein the initiating is performed prior to the snoop request reaching a first position in the queue;
determining whether said data in said buffer is available;
checking said queue holding said snoop request, said queue having a top and a bottom;
determining whether said request is at said top of said queue;
indicating said request is next for processing, if said request is at said top of said queue;
indicating said bus can receive said data, if said data in said buffer is available and said request is next for processing; and
sending said data to said bus.

19. The method of claim 18, further comprising:
determining when the bus is ready for a response to said request; and
returning data from said buffer in said response.

20. The method of claim 18, wherein said cache lookup transaction returns data when said data is in a one or more predetermined states.

21. The method of claim 20, wherein said predetermined state is a modified state.

* * * * *